United States Patent [19]

Nagane

[11] 4,424,534
[45] Jan. 3, 1984

[54] ORIGINAL READER

[75] Inventor: Hiromichi Nagane, Tokyo, Japan

[73] Assignee: Canon Kabushiki Kaisha, Tokyo, Japan

[21] Appl. No.: 335,467

[22] Filed: Dec. 29, 1981

[30] Foreign Application Priority Data

Jan. 9, 1981 [JP] Japan ................................. 56-1853
Jan. 9, 1981 [JP] Japan ................................. 56-2271

[51] Int. Cl.$^3$ ............................................. H04M 1/04
[52] U.S. Cl. .................................. 358/287; 358/293; 358/213; 355/57; 250/216
[58] Field of Search .............. 358/287, 285, 293, 213; 355/55, 57, 68; 350/266; 250/578, 216

[56] References Cited
U.S. PATENT DOCUMENTS

4,044,384  8/1977  Inokuchi ............................ 358/293
4,355,891 10/1982  Cole et al. ............................ 355/57

Primary Examiner—Tommy P. Chin
Assistant Examiner—Edward L. Coles
Attorney, Agent, or Firm—Fitzpatrick, Cella, Harper & Scinto

[57] ABSTRACT

An image of original is projected on an image reading element such as CCD selectively at a first magnification or at a second magnification. The first optical system for projecting the original image at the first magnification and the second optical system for projecting the original at the second magnification are separate systems and both of the optical systems are fixed. The magnification at which the original image is projected on the image reading element is changed from one to another by closing the optical path of the first optical system or that of the second optical system.

26 Claims, 8 Drawing Figures

ORIGINAL READER

BACKGROUND OF THE INVENTION

1. Field of the Invention

The present invention relates to an original reader for reading an image of original and forming an electric signal corresponding to the original image.

2. Description of the Prior Art

An original reader has many applications. For example, it is used in the transmitting of facsimile. In the case of facsimile, the ratio of the width of receiving paper to the width of transmitted original sheet is not always constant. It is variable case by case. However, even when the width ratio of receiving paper to original changes frequently, it is desired that all of the images of an original be record on the receiving paper to make full use of the width of the receiving paper. This desire can be satisfied by projecting the original image at a suitably selected magnification on the image sensor which receives the light and produces the corresponding electric signal. To accomplish it, it is essential that the magnification can be changed selectively in a simple manner.

According to the prior art, the magnification at which the original image is projected on the image sensor is changed by moving a part or all of the optical elements constituting a projection optical system. There is known an apparatus in which the optical path length before or after the projection lens is altered by moving a mirror, lens and other components constituting the optical path between the original illumination part and the image sensor in order to change the magnification of the projected image. In other known apparatus, lenses having different focal lengths are provided and they are selectively inserted in and retracted from the optical path in order to change the magnification. In any case, all or a part of the optical elements of the projection optical system must be moved every time the magnification is changed.

Obviously, these methods have some drawbacks or problems.

Since the optical elements are moved to change the magnification, there is often caused a problem of out-of-focus of the image on the image sensor. The defocused image projected on the image sensor results in poor quality of the recorded image. Also, there is caused another problem relating to the structure of the image sensor. As the image sensor, there is usually used a one-dimensional line image sensor such as CCD (Charge Coupled Device). The width of the photo sensing area of such an image sensor is extremely narrow, that is generally in the order of 0.1 to 0.15 mm. When the optical elements are moved in the above-mentioned apparatus, the positional relation between the optical axis of the projection optical system and the image sensor with respect to the direction along the width of the photo sensing area, is very easily altered resulting in a deviation from alignment. Since, as previously noted, the width of the photo detection area of the sensor is very small, this positional deviation has a great effect on the sensor. The adverse effect caused by it is that the original image can not be projected on the image sensor in good timing. Somtimes, the image sensor can not receive any projected original image even after a read start signal has been issued. Sometimes, the image of the forward end part of the original has already passed over the image sensor even when the start signal is to be generated.

To improve the reliability of such an apparatus, these drawbacks should be overcome. To eliminate these problems, it has been necessary for the moving parts of the apparatus to have very high mechanical precision which in turn makes the apparatus complicated to structure, expensive in manufacture and easily troublesome.

SUMMARY OF THE INVENTION

Accordingly, it is an object of the invention to provide an original reader in which the magnification of an image projected on the image sensor can be changed in a very simple manner.

It is another object of the invention to provide an original reader which has no possibility of the trouble of out-of-focus of the projected image caused by the operation of changing the image magnification.

It is a further object of the invention to provide an original reader which has no possibility of the trouble of positional deviation with respect to the direction along the width of the photo detection area of the image sensor caused by the operation of changing the image magnification.

It is still a further object of the invention to provide an original reader which is simple in structure and able to change the magnification of image projected on the image sensor.

Other and further objects, features and advantages of the invention will appear more fully from the following description taken in connection with the accompanying drawings.

DESCRIPTION OF PREFERRED EMBODIMENTS

Figure 1:
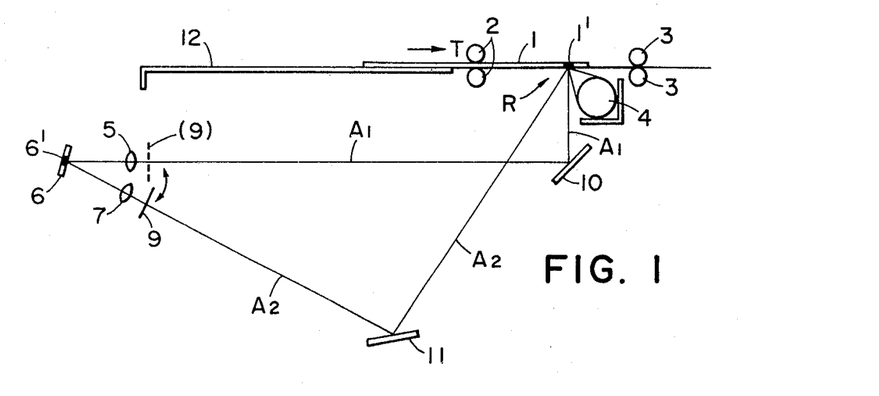
FIG. 1 is an explanative view of an embodiment of the present invention.
Figure 2:
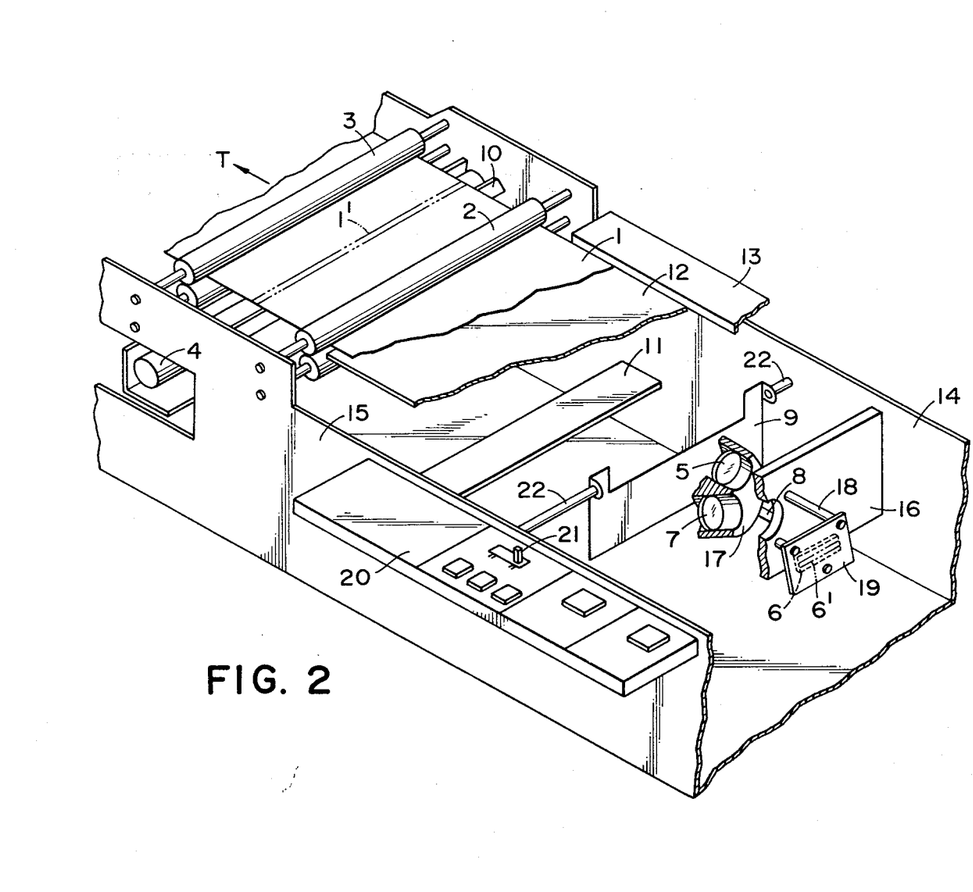
FIG. 2 is a perspective view of the apparatus shown in FIG. 1 with a part of the apparatus being cut away.

Referring first to FIGS. 1 and 2 showing a first embodiment of the invention, an original 1 to be read for transmission is moved in the direction of arrow T on an original table 12 by means of pairs of feed rollers 2 and 3 with the aid of a side edge guide member 13. At an illumination part R of the apparatus, the original 1 is illuminated by a lamp 4 fixed to side plates 14 and 15 of the main body. A narrow strip area 1' of the original 1 illuminated at the illumination part R is projected on a photo detection area 6' of an image sensor 6 through a projection optical system as will be described in detail later herein. The length of the narrow strip area 6' extends in the direction perpendicular to the original forwarding direction T. The photo detection area 6' is also a narrow strip area with its long sides extending in the direction perpendicular to the secondary scan direction, that is, the direction in which the image on the area 6' is moved with the movement of the original 1.

As the image sensor 6 there may be used CCD. To read the image projected on the area 6', CCD 6 scans the image in the longitudinal direction of the area 6' (primary scan direction). In other words, CCD 6 reads the narrow strip area 1' of the original 1 by scanning the area 1' along the length of the area 1'. CCD 6 transforms the information of image read by it into an electric signal corresponding to the image. After processing in a manner known per se, the electric signal is transmitted to a facsimile receiver at which the read image is reproduced on a receiving paper. The width of the photo detection area 6' in CCD 6 is generally in the range of 0.10 to 0.15 mm.

As the pairs of feed rollers 2 and 3 are intermittently rotated a little at a time, the original is forwarded in stepwise increments. Thus, the original 1 remains stopped until the sensor 6 completes the reading of one strip area of the original. Upon the completion of reading of the one strip area 1' of the original, the original is moved one step to the position in which the next strip area 1' of the original enters the illumination part R and it is projected on the photo detection area 6' of the sensor 6.

When a one-to-one magnification image signal of the original is desired, a first projection optical system is used. When a minified image signal of the original is desired, a second projection optical system is used.

The first projection optical system comprises a lens 5 and a mirror 10. The second projection optical system comprises a lens 7 and a mirror 11. To this end, the lenses 5 and 7 are disposed at different positions from each other. Also, the mirrors 10 and 11 are located at different positions as seen in FIG. 1. Therefore, the optical path of the first projection optical system is different from that of the second projection optical system. The former extends from the original illumination part R to the sensor 6 passing through the mirror 10 and the lens 5, whereas the latter optical path extends from the original illumination part R to the sensor 6 passing through the mirror 11 and the lens 7. The magnification at which the original image is projected on the sensor 6 by the first projection optical system is also different from the magnification at which the original image is projected on the sensor 6 by the second projection optical system. In other words, the ratio of the optical path length between sensor 6 and lens 5 to the optical path length between lens 5 and illumination part R is different from the ratio of the optical path length between sensor 6 and lens 7 to the optical path length between lens 7 and illumination part R. However, the optical axis $A_1$ of the first projection optical system and the optical axis $A_2$ of the second one are coincident with each other at the illumination part R and also at the photo detection area 6' of the sensor 6. Therefore, the optical axes $A_1$ and $A_2$ are incident on the same position of the photo detection area 6' and also on the same position of the strip area 1' of the original 1 arrived at the illumination part R.

As seen best in FIG. 2, the mirrors 10 and 11 are fixedly supported by the side plate 14 on one side and the side plate 15 on the other side. The lenses 5 and 7 are fixedly mounted in a lens holder 17 which is in turn fixed to a stay plate 16. The stay plate 16 is fixed to the side plates 14 and 15 by means of a stay 8. Obviously, in this arrangement, the first projection optical system and its optical path as well as the second projection optical system and its optical path are fixed. The sensor 6 is fixed on and supported by a holder 19 fixed on the stay plate 16 by means of a stay 18.

Designated by 9 is a movable shutter plate serving as a screen member against light. To selectively move the shutter plate 9 there is provided an operating lever 21 on a operation panel 20 of the reader. As suggested in FIG. 1, the shutter plate 9 can be brought into a first position or a second position selectively by operating the operating lever 21. In the first position (solid line in FIG. 1), the shutter plate 9 cuts off the optical path of the second projection optical system and opens the optical path of the first projection optical system. In the second position (broken line in FIG. 1), the shutter plate opens the optical path of the second projection optical system and cuts off that of the first one.

Figure 3:
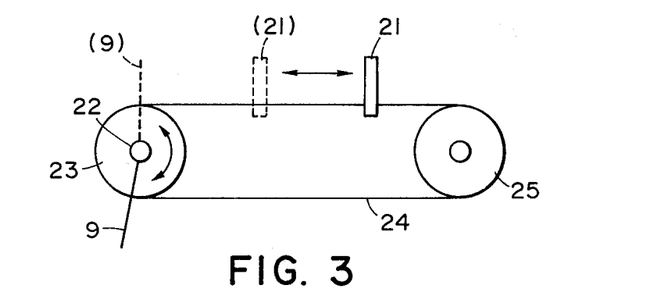
FIG. 3 is a schematic illustration of an example of the shutter driving mechanism used in the apparatus.

The mechanism for moving the shutter plate 9 is shown in FIG. 3. The shutter plate 9 is fixedly mounted on a shaft 22 for rotation together with the shaft. The shaft 22 is rotatably supported by the side plates 14 and 15. As seen in FIG. 3, the shaft 22 has a pulley 23 fixed thereto. A wire 24 extends around the pulley 23 to another pulley 25 rotatably supported by the side plate 15. The wire 24 is fastened to the above-mentioned operating lever 21. When the lever 21 is moved from the position indicated by solid line to the position suggested by broken line in FIG. 3 by the operator, the shutter plate 9 is also moved rotationally from the first position indicated by solid line to the second position suggested by broken line. When the lever 21 is moved from the broken line position to the solid line position, the shutter plate 9 is rotated from the second position to the first position (FIGS. 1 and 3).

For example, when the operator moves the operating lever 21 to the position indicated by solid line in FIG. 3 to transmit one-to-one magnification information signal, the shutter plate 9 is brought into the position before the lens 7 to cut off the optical path of the second projection optical system as indicated by the solid line in FIG. 1. In this position, the optical path of the first projection optical system is opened. Therefore, an image of every strip area 1' of the original 1 moved stepwisely passing through the illumination part R is focused on the photo detection area 6' of the sensor 6 through the mirror 10 and lens 5. To transmit a minified information signal, the operator changes over the lever 21 from the solid position to the phantom position (21) in FIG. 3. Thereby, the shutter plate 9 is moved from the first position indicated by solid to the second position (9) suggested by phantom in FIG. 1. In this position, the shutter plate 9 is before the lens 5 to cut off the optical path of the first projection optical system and open the optical path of the second one. An image of every strip area of the original 1 is therefore focused on the sensor 6 through the mirror 11 and lens 7.

Although the optical path selecting shutter plate 9 has been shown to selectively take a position immediately before the lens 5 or a position immediately before the lens 7, it should be understood that the first and second working positions of the shutter plate may be determined differently from the above embodiment. Any positions in the two optical paths may be selected for the working positions of the shutter plate 9 provided that at the selected positions the shutter 9 can cut off one of the two optical paths while opening the other. Also, other driving mechanism than that shown in the above embodiment may be used for driving the optical path selecting shutter plate 9. For example, the shutter plate 9 may be driven also by use of a motor or a solenoid.

In any case, with the arrangement of the above embodiment, both of the first and second projection optical systems always remain fixed and the selection of magnification can be made by changing the position of the shutter plate 9 only. Therefore, according to the invention, all of the troubles of out-of-focus, failure to obtain the desired magnification and disalignment of the optical axis with the very narrow photo detection area of the sensor which are otherwise caused by changing the magnification can completely be eliminated. In addition, with the above arrangement, the mechanism for driving the shutter plate 9 is not required to be very precise. This makes it possible to simplify the structure of the apparatus and minimize the possibility of trouble in the apparatus.

Figure 4:
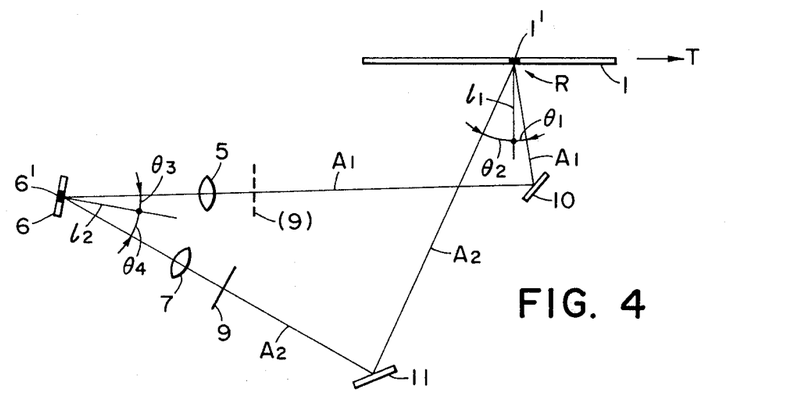
FIG. 4 is a view illustrating the incident angles of the optical axes to the original and to the sensor in the apparatus.

FIG. 4 is a view showing only the essential part of the above apparatus. $l_1$ is a line normal to the original surface and drawn from the narrow strip area 1' to be read. $l_2$ is a line normal to the photo sensor surface 6'. $\theta_1$ is the angle which the optical axis $A_1$ incident on the original surface forms with the normal line $l_1$. Namely, $\theta_1$ is the incident angle of the optical axis $A_1$ to the original surface. Similarly, $\theta_2$ is the incident angle of the optical axis $A_2$ to the original surface. $\theta_3$ is the incident angle of the optical axis $A_1$ to the photo sensor surface and $\theta_4$ is the incident angle of the optical axis $A_2$ to the photo sensor surface. As readily understood, these incident angles $\theta_1$, $\theta_2$, $\theta_3$ and $\theta_4$ may be altered by suitably changing the positions and angles of the sensor, mirrors and lenses. Since the width of the photo detection area 6' is very small, $\theta_1$ and $\theta_2$ may be the same or different and also $\theta_3$ and $\theta_4$ may be the same or different. Further, $\theta_1$ and $\theta_3$ may be the same or different and also $\theta_2$ and $\theta_4$ may be the same or different. However, in case that $\theta_1$ is different from $\theta_2$, it is preferred that $\theta_1$ and $\theta_3$ are equal and also $\theta_2$ and $\theta_4$ are equal to each other. In this case, as a matter of course, $\theta_3$ is different from $\theta_4$.

It is also preferred that $\theta_1$ and $\theta_2$ are equal and $\theta_3$ and $\theta_4$ are equal. In this case, the two optical axes $A_1$ and $A_2$ enter the original 1 in opposed directions to each other relative to the normal line $l_1$ and enter the sensor 6 in direction also opposed to each other with respect to the normal line $l_2$. Further, in this case, although $\theta_1$, $\theta_2$ may be different from $\theta_3$, $\theta_4$, it is more preferable that all of $\theta_1$, $\theta_2$, $\theta_3$, $\theta_4$ be the same angle. Preferably, $\theta_1$ and $\theta_3$ are 0° or $\theta_2$ and $\theta_4$ are 0°.

The above description made with reference to FIG. 4 is applied also to the following embodiments. In the following embodiments, the same or functionally corresponding elements to those in the above embodiment shown in FIGS. 1 to 4 are indicated by the same reference characters as used in FIGS. 1 to 4. For the purpose of simplification of explanation, description of such elements will be omitted hereinafter so long as no further description is necessary.

Figure 5:
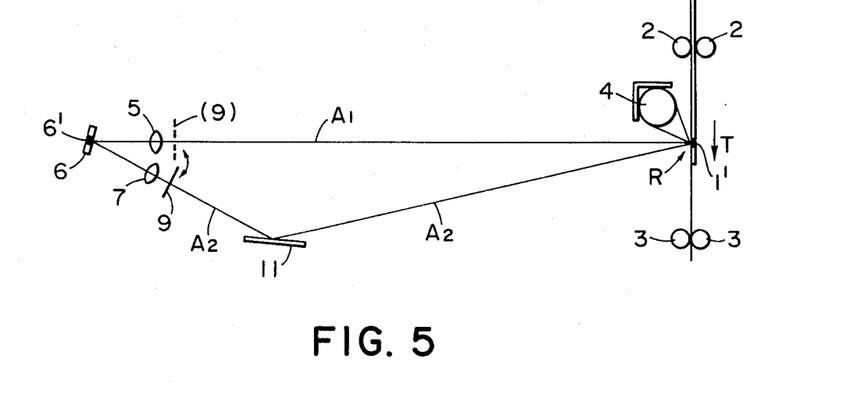
FIG. 5 shows another embodiment of the invention.

In another embodiment of the invention shown in FIG. 5, the original is moved vertically. The first projection optical system comprises only a lens 5 which is fixed at a position in which the lens 5 can form an original image with a predetermined magnification on a sensor 6. This predetermined magnification is hereinafter called a first magnification. The second projection optical system in this embodiment comprises again a mirror 11 and a lens 7 by which an image of the original is formed on the sensor 6 with another predetermined magnification which is hereinafter called a second magnification. To select either the first or second magnification, there is provided a shutter plate 9 the manner of operation of which is entirely the same as above. By the operator's operation for magnification selection, the shutter plate 9 is selectively moved to open one of the two optical paths and close the other.

Figure 6:
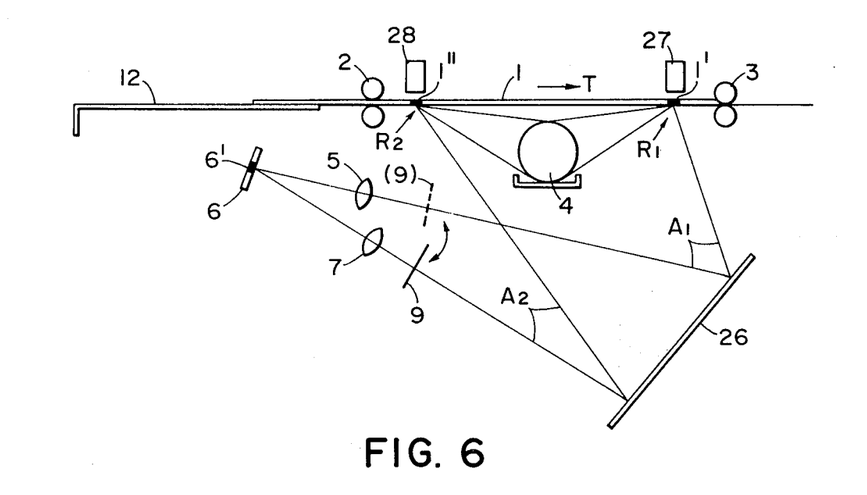
FIG. 6 shows a further embodiment of the invention.

FIG. 6 shows a further embodiment of the invention. In this embodiment, the first and second projection optical systems include a mirror 26 which is common to both of the first and second optical systems. $R_1$ is the original illumination part of the first projection optical system and $R_2$ is that of the second one. As shown in FIG. 6, the two illumination parts $R_1$ and $R_2$ are located at two different positions with respect to the direction T in which the original is moved stepwise. In the shown embodiment, the illumination parts $R_1$ and $R_2$ are illuminated by a common lamp 4. However, two lamps may be provided to illuminate the illumination part $R_1$ by one of the two lamps and $R_2$ by the other lamp with each lamp independent of the other. In this case, the lamp for illumination part $R_1$ or the lamp for $R_2$ is selectively put on according to the magnification selected.

When selection is made to form one-to-one magnification image signals, the narrow strip area 1' of the original staying at the illumination part $R_1$ is projected on the photo detection area 6' through the mirror 26 and lens 5. If selection is made to form minified image signals, the narrow strip area 1'' of the original staying at the illumination part $R_2$ is projected on the photo detection area 6' through the common mirror 26 and lens 7.

Although the mirror 26 is common to the first and second projection optical systems, as clearly seen in FIG. 6, the position on the common mirror 26 belonging to the optical path of the first optical system and the position on the mirror belonging to the optical path of the second optical system are different from each other. Therefore, it should be understood that the optical path of the first projection optical system and that of the second one are different from each other. The optical axis $A_1$ of the first optical system is incident on the area 1' and the optical axis $A_2$ of the second one is incident on the area 1''.

Again, a shutter plate 9 is moved by a magnification changing operation to selectively open one of the two optical paths and close the other.

In the embodiment shown in FIG. 6 there are provided two paper sensors 27 and 28 of which the paper sensor 27 is positioned immediately above the illumination part $R_1$ and the other paper sensor 28 is immediately above the illumination part $R_2$. Each of the paper sensors 27 and 28 may be a reflection type photo sensor formed, for example, of light emitting element and photo cell or a microswitch or the like. The function of the paper sensors 27, 28 is to issue a signal when the leading end of an original reaches the position of the optical axis $A_1$ or $A_2$ and to terminate the issuance of signal when the original has left the position.

Figure 7:
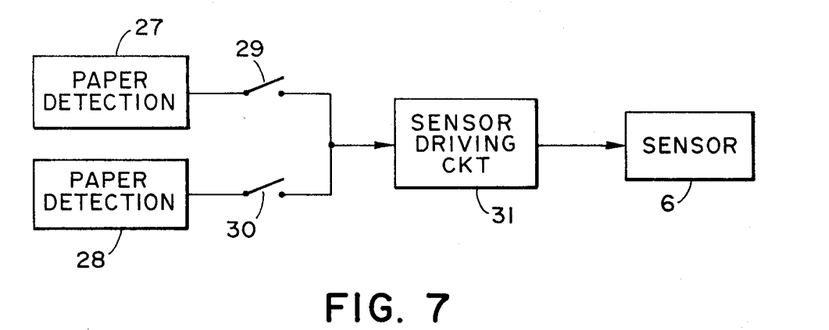
FIG. 7 is a block diagram showing an example of the sensor driving and controlling apparatus used in the invention.

As shown in FIG. 7, the paper sensors 27 and 28 is connected to a sensor driving circuit 31 through switches 29 and 30, respectively. The switch 29 is turned ON when one-to-one magnification image signal is formed and turned OFF when a minified image signal is formed. On the contrary, the switch 30 is turned ON when a minified image signal is formed and turned OFF when one-to-one magnification image signal is formed. Therefore, when one-to-one magnification image signal is to be formed, the sensor 6 can not be driven even when the forward edge of the original 1 comes into the illumination area $R_2$ during the time of the original being moved forward by a pair of rollers 2. However, when the forward edge of the original 1 reaches the illumination part $R_1$, then the paper sensor 27 issues a signal by means of which the sensor driving circuit 31 is brought into operation to start driving the sensor 6. When the rear end of the original 1 has passed over the illumination part $R_1$, the paper sensor 27 is deenergized and therefore the sensor driving circuit 31 is also deenergized. Thus, the sensor 6 stops operating.

On the contrary, when a minified image signal is to be formed, the paper sensor 28 issues a signal as soon as the forward edge of the original 1 has come into the illumination part $R_2$. By means of the signal, the sensor 6 is driven by the driving circuit 31 in a manner similar to the above. When the rear end of the original has just passed over the illumination part $R_2$, the paper sensor 28 is deenergized and therefore the sensor 6 stops operating.

The distance between the two illumination parts $R_2$ and $R_1$ is fixed. Furthermore, the time t required to move the forward edge of the original from $R_2$ to $R_1$ by the pair of rollers 2 for formation of one-to-one magnification image signal is constant. Therefore, the paper sensor 27 may be omitted while using only the paper sensor 28. Such a modification is shown in FIG. 8.

Figure 8:
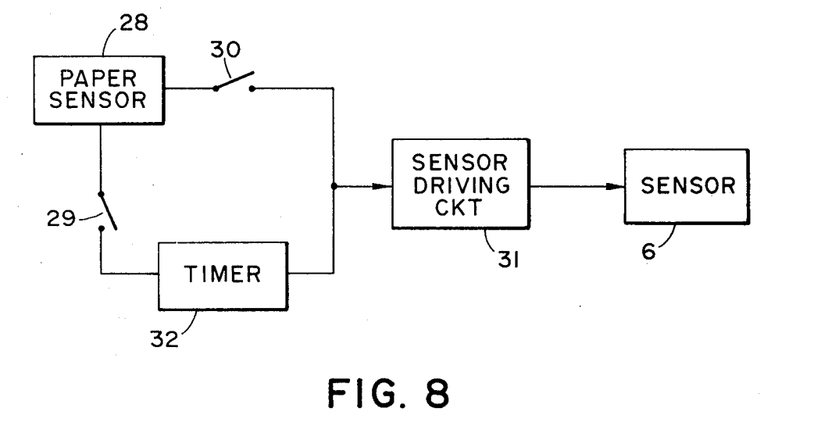
FIG. 8 shows another example of the sensor driving and controlling apparatus.

The embodiment shown in FIG. 8 includes a timer 32. When one-to-one magnification image signal is to be formed, the signal issued from the paper sensor 28 is introduced into the timer 32. Upon the lapse of the above-mentioned time t, the timer 32 makes the sensor driving circuit 31 start operating. Also, when the time t has passed starting from the time point when the rear ends of the original passed over the paper sensor 28, the timer 32 makes the sensor driving circuit 31 deenergized.

In any case, a particular advantage can be obtained by employing the above embodiments wherein the position of the original is detected to control the timing of start for scanning the original image by the sensor 6. Even when the original illumination parts are located at different positions for different magnifications, there occurs no trouble of failure to read the forward end part of the original. The entire area of the original can be read without fail. Therefore, the reliability of the reader can be improved according to the above embodiments.

In the embodiments shown in FIGS. 1 and 5 there may be provided also a paper sensor 27 at the original illumination part R. Since the illumination part R in the embodiment shown in FIG. 1 or 5 is common to the formation of one-to-one magnification image signal and the formation of a minified image signal, the paper sensor 28 and switches 29 and 30 shown in FIG. 7 are unnecessary in this case.

While the present invention has been particularly shown and described with reference to such embodiments thereof wherein a one-to-one magnification image signal and a minified image signal are selectively obtained, it should be understood that the present invention is applicable also to such apparatus in which a one-to-one magnification image signal and a magnified image signal are selectively obtained. It is no matter what magnifications are selectively used in the apparatus. Also, the number of magnifications for selection is never limited to only two. The present invention is applicable to various document readers in which the selection of magnification can be made among three or more different magnification values.

Also, as for the shutter for selectively closing and opening the optical paths, many modifications are possible in light of the above teachings. For example, individual shutters may be provided for the respective optical paths so that the optical paths can be opened and closed independent of each other according to the magnification selected. Use of the so-called lens shutters within the respective lenses 5 and 7 is an example of such a modification. In this case, the lens shutters are alternately opened and closed according to the magnification selected.

Further it should be understood that the application of the present invention is never limited to a facsimile transmission apparatus only. The present invention is applicable to various other apparatus of the type in which image data are transformed into electric signals, the electric signals are provisionally stored in a memory and then a desired image is formed on the basis of the stored electric signals.

I claim:

1. An original reader, comprising:
    means for illuminating an original;
    image reading means for receiving light and for generating an electric signal corresponding to the received light;
    a fixed first projection optical system for projecting an image of the original illuminated by said illuminating means on said image reading means at a first magnification, said fixed first projection optical system having a first stationary lens;
    a fixed second projection optical system for projecting an image of the original illuminated by said illuminating means on said image reading means at a second magnification through an optical path different from the optical path of said first projection optical system, said fixed second projection optical system having a second stationary lens; wherein the first and second stationary lenses are disposed such that the ratio of the optical path length between said image reading means and the first lens to the optical path length between the first lens and the original is different than the ratio of the optical path length between said image reading means and the second lens to the optical path length between the second lens and the original; and
    means for selectively opening and closing the optical path of said first projection optical system and the optical path of said second projection optical system in accordance with the selected magnification.

2. An original reader as set forth in claim 1, wherein an incident angle of an optical axis of said first projection optical system to said image reading means is different than an incident angle of an optical axis of said second projection optical system to said image reading means.

3. An original reader as set forth in claim 2, wherein the incident angle of the optical axis of said first projection optical system to the original is different from the incident angle of the optical axis of said second projection optical system to the original.

4. An original reader as set forth in claim 3, wherein the incident angle of the optical axis of said first projection optical system to said image reading means and the incident angle thereof to the original are the same and the incident angle of the optical axis of said second projection optical system to said image reading means and the incident angle thereof to the original are the same.

5. An original reader as set forth in claim 1, wherein the optical axis of said first projection optical system and the optical axis of said second projection optical system are incident on said image reading means in directions opposed to each other, and the incident angle of the optical axis of said first projection optical system to said image reading means and the incident angle of the optical axis of said second projection optical system are the same.

6. An original reader as set forth in claim 5, wherein the optical axis of said first projection optical system and the optical axis of said second projection optical system are incident on the original in directions opposed to each other, and the incident angle of the optical axis of said first projection optical system to the original and the incident angle of the optical axis of said second projection optical system to the original are the same.

7. An original reader as set forth in claim 6, wherein said incident angles are all the same.

8. An original reader as set forth in any one of claims 1 to 7, wherein said original reader further comprises means for conveying the original passing through the area illuminated by said illumination means.

9. An original reader as set forth in claim 8, wherein said original reading means read-scans the original image with respect to the direction intersecting the direction in which the original is conveyed.

10. An original reader as set forth in claim 1, wherein said optical path opening and closing means includes light shutout means for closing the optical path of either said first optical system or that of said second optical system according to the magnification then selected.

11. An original reader, comprising:
illumination means for irradiating an original with an illumination light;
means for conveying the original through said illumination means;
image reading means for receiving light and for generating an electric signal corresponding to the received light;
a first stationary lens disposed in a first optical path for projecting an image of the original at said illumination means on said image reading means at a first magnification;
a second stationary lens disposed in a second optical path different from said first optical path for projecting an image of the original at said illumination means on said image reading means at a second magnification; and
means for selectively opening and closing said first and second optical paths according to the magnification then selected,
wherein the optical axes of said first and second optical paths are incident on said image reading means in directions opposed to each other and the incident angles of the optical axes of said first and second optical paths to said image reading means are the same.

12. An original reader as set forth in claim 11, wherein an optical axes of said first and second optical paths are incident on the original in directions opposed to each other and an incident angles of the optical axes of said first and second optical paths are the same.

13. An original reader as set forth in claim 12, wherein the incident angles are all the same.

14. An original reader as set forth in any one of claims 1, and 13, wherein said original reading means read-scans the original image with respect to the direction intersecting the direction in which said original is conveyed.

15. An original reader as set forth in claim 11, wherein said optical path opening and closing means includes light shutout means for closing either said first optical path or said second optical path according to the magnification then selected.

16. An original reader, comprising:
means for conveying an original;
first illumination means for irradiating the original being conveyed by said conveying means with an illumination light;
second illumination means for irradiating the original being conveyed by said conveying means with an illumination light;
image reading means for receiving light and for generating an electric signal corresponding to the received light;
a first stationary lens disposed in a first fixed optical path for projecting an image of the original at said first illumination means on said image reading means at a first magnification;
a second stationary lens disposed in a second optical path for projecting an image of the original at said second illumination means on said image reading means at a second magnification wherein the first and second stationary lens are disposed such that the ratio of the optical path length between said image reading means and the first lens to the optical path length between the first lens and the original is different than the ratio of the optical path length between said image reading means and the second lens to the optical path length between the second lens and the original; and
means for selectively opening and closing said first and second optical paths according to the magnification then selected.

17. An original reader as set forth in claim 16, wherein an incident angle of an optical axis of said first optical path to said image reading means and that of said second optical path to said image reading means are different.

18. An original reader as set forth in claim 17, wherein the incident angle of the optical axis of said first optical path to the original and that of said second optical path to the original are different.

19. An original reader as set forth in claim 18, wherein the incident angles of the optical axis of said first optical path to said image reading means and to the original are the same and also the incident angles of the optical axis of said second optical path to said image reading means and to the original are the same.

20. An original reader as set forth in claim 16, wherein the optical axes of said first and second optical paths are incident on said image reading means in directions opposed to each other and the incident angles of the optical axes of said first and second optical paths to said image reading means are the same.

21. An original reader as set forth in claim 20, wherein the optical axes of said first and second optical paths are incident on the original in directions opposed to each other and the incident angles of the optical axes of said first and second optical paths to the original are the same.

22. An original reader as set forth in claim 21, wherein said incident angles are all the same.

23. An original reader as set forth in any one of claims 16 to 22 wherein said image reading means read-scans the original image with respect to the direction intersecting the direction in which the original is conveyed.

24. An original reader as set forth in claim 16, wherein said optical path opening and closing means includes light shutout means for closing either said first optical path or said second optical path according to the magnification then selected.

25. An original reader as set forth in claim 23, further comprising control means for detecting the position of the forward edges of the original being conveyed by said conveying means, wherein said control means starts to drive said image reading means when the forward edge of the original comes into said first illumination means when the first magnification has been selected and said control means starts to drive said image reading means when the forward edge of the original comes into said second illumination means when the second magnification has been selected.

26. An original reader, comprising:

means for conveying an original;

first illumination means for irradiating the original being conveyed by said conveying means with an illumination light;

second illumination means for irradiating the original being conveyed by said conveying means with an illumination light;

image reading means for receiving light and for generating an electric signal corresponding to the received light, wherein said image reading means read-scans the original image with respect to the direction intersecting the direction in which the original is conveyed;

a first stationary lens disposed in a first optical path for projecting an image of the original at said first illumination means on said image reading means at a first magnification;

a second stationary lens disposed in a second optical path for projecting an image of the original at said second illumination means on said image reading means at a second magnification;

means for selectively opening and closing said first and second optical paths according to the magnification then selected;

control means for detecting the position of the forward edge of the original being conveyed by said conveying means, wherein said control means starts to drive said image reading means when the forward edge of the original comes into said first illumination means when first magnification has been selected and said control means starts to drive said image reading means when the forward edge of the original comes into second illumination means when the second magnification has been selected.

* * * * *